United States Patent
Gindele et al.

(10) Patent No.: US 6,775,407 B1
(45) Date of Patent: Aug. 10, 2004

(54) PRODUCING A FINAL MODIFIED DIGITAL IMAGE USING A SOURCE DIGITAL IMAGE AND A DIFFERENCE DIGITAL IMAGE

(75) Inventors: Edward B. Gindele, Rochester, NY (US); Kevin E. Spaulding, Spencerport, NY (US)

(73) Assignee: Eastman Kodak Company, Rochester, NY (US)

(*) Notice: Subject to any disclaimer, the term of this patent is extended or adjusted under 35 U.S.C. 154(b) by 647 days.

(21) Appl. No.: 09/631,348

(22) Filed: Aug. 2, 2000

(51) Int. Cl.[7] .................. G06K 9/36; G06K 1/00; G03F 3/08; G06F 15/167
(52) U.S. Cl. ............. 382/166; 382/232; 358/1.15; 358/518; 709/213
(58) Field of Search .................. 382/232, 162, 382/167, 309, 166; 358/1.15, 518; 709/204, 201, 213, 217; 178/18.01; 345/2.2; 355/40

(56) References Cited

U.S. PATENT DOCUMENTS

| | | | |
|---|---|---|---|
| 4,731,671 A | 3/1988 | Alkofer | 382/169 |
| 4,945,406 A | 7/1990 | Cok | 382/263 |
| 5,012,333 A | 4/1991 | Lee et al. | 358/520 |
| 5,081,692 A | 1/1992 | Kwon et al. | 358/506 |
| 5,319,719 A * | 6/1994 | Nakazawa et al. | 382/132 |
| 5,710,824 A * | 1/1998 | Mongeon | 382/162 |
| 5,745,688 A * | 4/1998 | Oka | 709/204 |
| 5,774,599 A * | 6/1998 | Muka et al. | 382/254 |
| 5,822,453 A | 10/1998 | Lee et al. | 382/169 |
| 6,282,313 B1 * | 8/2001 | McCarthy et al. | 382/162 |
| 6,295,136 B1 * | 9/2001 | Ono et al. | 358/1.15 |
| 6,429,923 B1 * | 8/2002 | Ueda et al. | 355/40 |

FOREIGN PATENT DOCUMENTS

| | | | | |
|---|---|---|---|---|
| EP | 0 689 342 A2 | 6/1995 | | H04N/1/417 |
| EP | 0 889 636 A2 | 6/1998 | | H04N/1/32 |
| JP | 08139911 A * | 5/1996 | | H04N/1/387 |

* cited by examiner

*Primary Examiner*—Wenpeng Chen
(74) *Attorney, Agent, or Firm*—Raymond L. Owens

(57) ABSTRACT

A method for processing a digital image in a distributed manner to produce a final modified digital image includes providing a source digital image at a first computer, providing the source digital image at a second computer, and modifying the source digital image at the second computer to form a first modified digital image. The method further includes determining a difference digital image representing the difference between the source digital image and the first modified digital image, transferring the difference digital image to the first computer, and combining the difference digital image with the source digital image at the first computer to form the final modified digital image.

1 Claim, 14 Drawing Sheets

PRODUCING A FINAL MODIFIED DIGITAL IMAGE USING A SOURCE DIGITAL IMAGE AND A DIFFERENCE DIGITAL IMAGE

CROSS REFERENCE TO RELATED APPLICATIONS

Reference is made to commonly assigned U.S. patent application Ser. No. 09/354,808 filed Jul. 16, 1999 by Robert Parada et al. entitled "Representing Digital Images in a Plurality of Image Processing States"; U.S. patent application Ser. No. 09/543,652, filed Apr. 5, 2000 by Kevin Spaulding et al. entitled "Method of Processing and Paying for an Extended Color Gamut Digital Image"; and U.S. patent application Ser. No. 09/543,038 filed Apr. 5, 2000 by Kevin Spaulding et al. entitled "Method for Providing Access to an Extended Color Gamut Digital Image and Providing Payment Therefor", the disclosures of which are incorporated herein by reference.

FIELD OF THE INVENTION

The present invention relates to the field of digital imaging, and more particularly to processing a digital image making use of a difference digital image.

BACKGROUND OF THE INVENTION

The transmitting of digital images across digital communications networks is becoming increasingly important for many applications. For example, images might be stored on a network server, and downloaded to a local computer via a communications network such as the Internet, or a local area network. Due to the fact that digital images are typically relatively large in size, the transmission of the digital images can take an extensive amount of time in many cases.

In digital imaging systems, it is sometimes desirable to modify an image in some fashion. For example, an automatic algorithm can be applied to an image to determine a preferred color balance adjustment and modify the image accordingly. Other types of image manipulation algorithms would include operations such as sharpness adjustment, noise removal, tone scale adjustment, adding text labels and cropping. Sometimes these algorithms are applied automatically, and sometimes they are interactively applied according to user preferences. As such a convenient method is have the user modify the images on the user's computer. It is also desirable that one the images are modified to have them printed on a high quality digital printer. Such a device is not often located with the user's computer but may be connected via a computer network.

There are a number of digital imaging application scenarios of importance where an image is downloaded from a network server to a local computer via a communications network, and the image is then modified on the local computer with one or more types of image manipulation algorithms. In many cases, it is then desirable to send the modified digital image back to the network server for storage and/or printing. As a result, it is necessary to suffer the long transmission times again. This is sometimes exacerbated by the fact that some systems are even slower at transmitting digital data to a network server than they are at downloading it from the network server.

Digital imaging applications have been devised to reduce the data transmission requirements in conjunction with image manipulation software. The user modifies the images on the user's computer and manipulation software records the image processing parameters required to make the modifications. The remote computer, which also has a copy of the images receives the image processing parameters, which represent a small amount of data, and recreates the modified digital images at the remote site. While this method of image processing can work well, it requires that all the image manipulation algorithms and their corresponding parameters be available on both the user's computer and the remote computer. Moreover, the version of the image manipulation software must also be the same. Consequently, this method prevents arbitrary image processing manipulation modifications of the user's images.

SUMMARY OF THE INVENTION

It is an object of the present invention to efficiently transmit an arbitrarily modified digital image to a processing site.

This object is achieved by a method for processing a digital image in a distributed manner to produce a final modified digital image, comprising the steps of:

a) providing a source digital image at a first computer;

b) providing the source digital image at a second computer;

c) modifying the source digital image at the second computer to form a first modified digital image;

d) determining a difference digital image representing the difference between the source digital image and the first modified digital image;

e) transferring the difference digital image to the first computer; and f) combining the difference digital image with the source digital image at the first computer to form the final modified digital image.

ADVANTAGES

The present invention has an advantage that a difference digital image representing the difference between a source digital image and a modified digital image is typically more compressible than the modified digital image itself. Therefore the modified digital image can be stored with a smaller amount of digital memory. Likewise, the difference digital image can be transmitted via a communications network more quickly.

It is a further advantage of the present invention that the difference digital image representing the difference between a source digital image and a modified digital image can be used in conjunction with arbitrary image enhancement algorithms.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected form such systems, algorithms, components, and elements known in the art. Given the description as set forth in the following specification, all software implementation thereof is conventional and within the ordinary skill in such arts.

Figure 2:
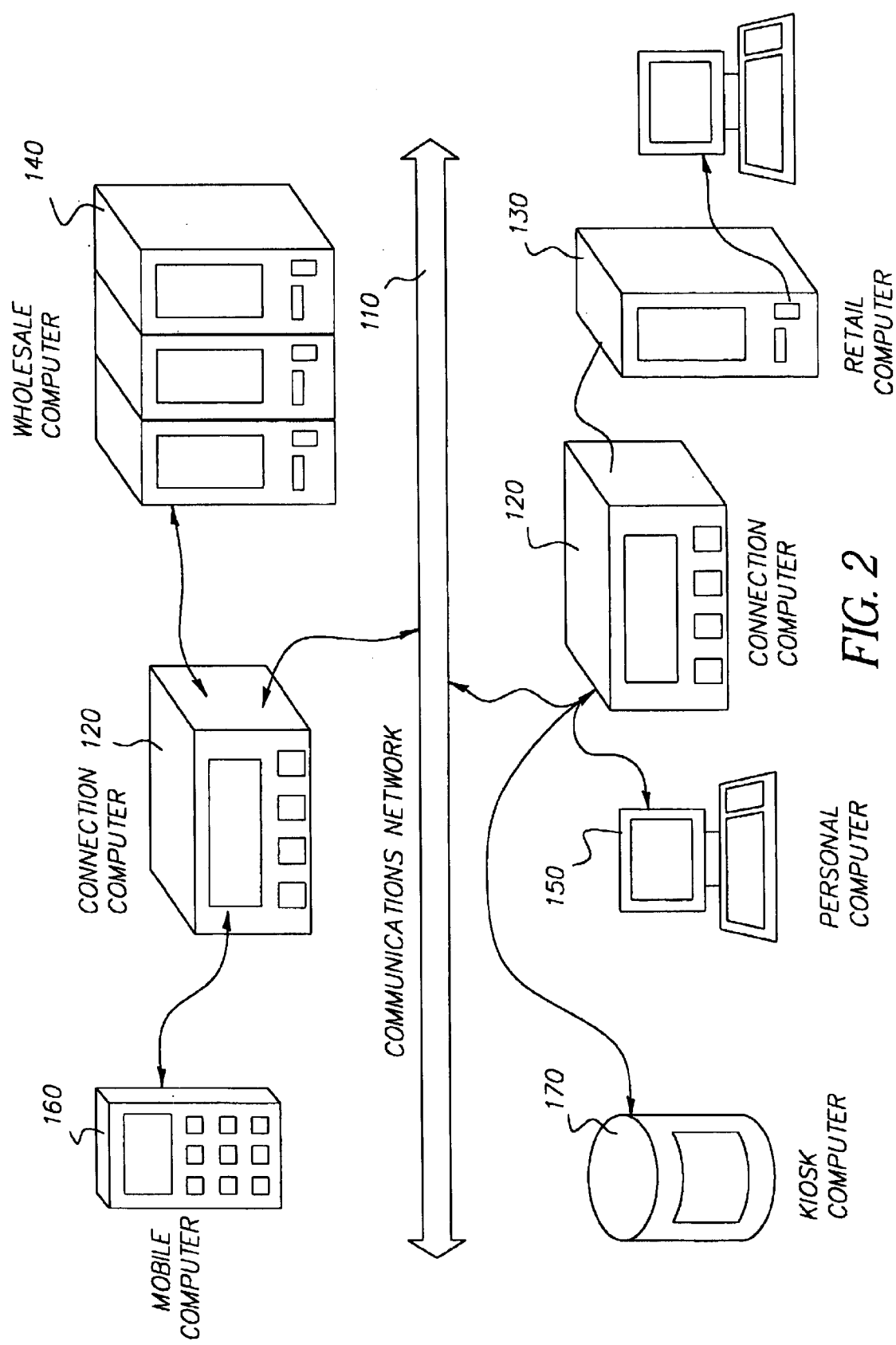
FIG. 2 is a block diagram showing a communications network of connected computers suitable for practicing the present invention.

The present invention may be implemented with multiple computers connected via a communications network. A communications network of multiple computers is illustrated in FIG. 2. Such a network of connected computers provides a means of sending and receiving information between any two or more connected computers. A communications network may include physical connections from one computer to another such as can be achieved with a conventional communications phone line. It is also possible for the communications network to include non-physically connected communications lines such as can be achieved with microwave communications links, radio communications links, coaxial cable television communications links, fiber optic communication links, or cellular telephone communications links. Thus, the present invention may be practiced with any of the communications systems mentioned above, but is not limited solely to these systems since the present invention relies on exchange of information not the means of achieving the exchange of information.

An image capable computer 100 is any device capable of executing a series of computational instructions that includes the manipulation of digital image data. Although fundamentally any image capable computer may have the capability to perform any computational instructions, the image capable computers illustrated in FIG. 2 have been given specialized names to emphasize the special purpose functions they perform. Some examples of image capable computers are a connection computer 120, retail computer 130, wholesale computer 140, personal computer 150, mobile computer 160, and kiosk computer 170. The present invention may be practiced with, but is not limited to, all of the above examples of image capable computers. It should also be considered that a given computer may be configured to perform more than one function illustrated in FIG. 2. However, for the purposes of discussion of the present invention, the specialized functions will be referred to as separate entities even though the physical implementation of the computer hardware may not always be separate.

The connection computer 120 shown in FIG. 2 refers to a specialized computer device which has been configured for the purposes of connecting other computers to the communications network 110. Such a computer may be the communications connection for the other types of computers shown—a retail computer 130, a wholesale computer 140, a personal computer 150, a mobile computer 160, and a kiosk computer. The main function performed by a connection computer 120 is the facilitation of transfer or exchange of information rather than the processing of information. A single connection computer may be connected to many other computers. As illustrated in FIG. 2, both connection computers shown are connected to multiple other computers and to each other. The arrows in the diagram of FIG. 2 represent the exchange of information, which in general, is bi-directional i.e.; the flow of information may be achieved in either direction. Since information may flow from computer to computer for the computers, a network of connected computers is formed. Computers not shown in diagram of FIG. 2 might be connected symbolically via the communications network 110. Thus, any computer connected to another computer which is connected to the communications network is also connected and may exchange information with any other computer connected to the network. For the purposes of the discussion of the present invention the collection of interconnected computers including the communications network will be referred to as the Internet.

A personal computer 150, a mobile computer 160, and a kiosk computer 170 are shown connected to the communications network 110 via a connection computer 120. These computers have the capability for the exchange and display of information. In particular, as it relates to the present invention, these computers have the ability to, but are not limited to, the display of text, graphic, and image information. Such a computer is typically connected to the Internet with software that understands a variety of protocols and manages the visual display of information. One such combination of display software and software protocol is a World Wide Web (WWW) browser which understands Hypertext Markup Language (HTML). Other display software and other software protocols exist. The present invention is not limited to a Web browser processing HTML documents and may be practiced with any combination of software that manages and displays information.

A personal computer 150 represents a computer that is often operated by a single person at a time. Typical personal computers are installed in homes and businesses. Individual users may access the Internet with a connected personal computer. Personal computers may be portable units such as a laptop computer. If a personal computer is connected to the Internet with a wireless connection it may be located almost anywhere. In such a configuration, the personal computer may represent a mobile computer 160. Fundamentally, a mobile computer and personal computer may differ mostly in size and weight.

A kiosk computer 170 represents a computer that may be dedicated to a commercial task of performing a specialized service. These computers are generally owned and maintained by businesses and operated primarily by consumers. An automatic teller machine (ATM) is an example of a kiosk computer. A typical kiosk computer might include a means for displaying information, selecting service choices, and indicating a payment method for the service selection. Although these three features of a typical kiosk computer are common, the present invention may be practiced with kiosk computers with fewer or more features than the ones described.

A retail computer 130 represents a computer that may also be dedicated to a commercial task of performing a specialized service set in a retail business. These computers are generally owned and maintained by the retail business and operated either by consumers or store personnel. Typical retail computers may include a variety of devices connected.

Referring to FIG. 2, a wholesale computer 140 represents a computer that may also be dedicated to a commercial task of performing a specialized service. These computers are generally dedicated to high volume processing tasks of large amounts of data. For example, a wholesale computer may contain specialized hardware that enables particularly fast computation of image processing functions. The main difference between a retail computer 130 and a wholesale computer 140 is in the emphasis or level of user or operator assistance required for the software running on these computers. The retail computer 130 emphasizes the human interaction with the software while the wholesale computer 140 emphasizes the automatic mode of the software. The wholesale computer 140 in general is computationally faster than the retail computer 130. Accordingly, images to be processed may be sent from the retail computer 130 to the wholesale computer 140, processed on the wholesale computer 140, and sent back via the communications network 110 to the retail computer 130.

It is assumed that all of the above mentioned computers may have the capability to store the computational instructions, or software in a variety of means which include, but are not limited to, random access memory (RAM), read only memory (ROM), or some form of off-line storage means such as magnetic or optical storage devices.

An image can refer to any form of visual information in recorded or displayed form. Examples of recorded images may include, but are not limited to, a photographic film negative, a photographic film transparency, a motion picture film, and a photographic print. Displayed forms of images may include, but are not limited to, visual presentations made on electronic displays such as CRT monitors, LCD panels, electroluminescent devices, and LASER projection systems.

A digital image is comprised of one or more digital image channels. Each digital image channel is comprised of a two-dimensional array of pixels. Each pixel value relates to the amount of light received by the image capture device 10 corresponding to the geometrical domain of the pixel. For color imaging applications a digital image will typically consist of red, green, and blue digital image channels. Although the preferred embodiment of the present invention is practiced with digital images produced with a capture device 10, the present invention is not limited to pixel data relating to photographs. For example, graphic or other synthetic data may be merged with photographically captured pixel data and still be considered a digital image. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention may be applied to, but is not limited to, a digital image for any of the above mentioned applications. Although the present invention describes a digital image channel as a two dimensional array of pixel values arranged by rows and columns, those skilled in the art will recognize that the present invention can be applied to mosaic (non rectilinear) arrays with equal effect.

Figure 3:
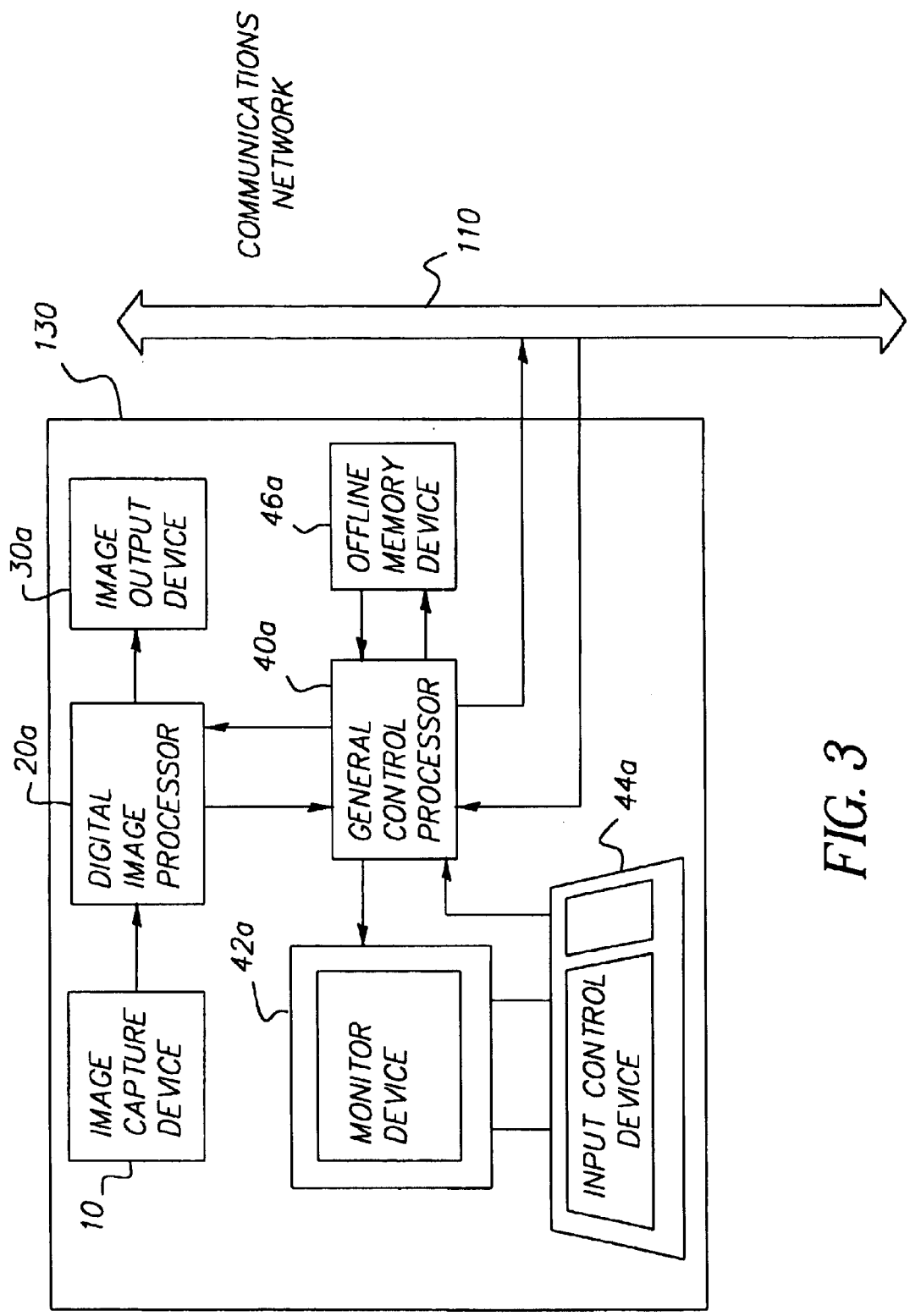
FIG. 3 is a block diagram showing a retail computer which includes a digital image processor.

The present invention may be implemented in a combination of computer hardware software as shown in FIG. 3 within a retail computer 130. Although the preferred embodiment of the present invention is practiced with a retail computer 130, any image capable computer 100 can perform the tasks required of the present invention. The following description relates to a digital imaging system as a subset of the components of a retail computer 130 which includes an image capture device 10, a digital image processor 20a, an image output device 30a, and a general control processor 40a. The system may include a monitor device 42a such as a computer console or paper printer. The system may also include an input control device 44a for an operator such as a keyboard and/or a mouse pointer. More than one capture device 10 may be connected to the digital image processor 20a as the present invention may be used with digital images derived from a variety of imaging devices. For example, FIG. 3 may represent a digital photofinishing system where the image capture device 10 is a conventional photographic film camera. The photographic film camera can capture a scene on photographic film negative or photographic film transparency and a film scanner device for scanning the developed image on the film and producing a digital image. The present invention can also be used with other image capture devices 10; such as but not limited to, digital cameras and print scanners. The digital image processor 20a provides the means for processing the digital images to produce pleasing looking images on the intended output device or media or alternatively, for analyzing the content of processed digital images. Although a single image output devices 30a is shown, the present invention may be used in conjunction with a variety of image output devices 30a which may include a digital photographic printer and soft copy display. The digital image processor 20a may process the digital image to adjust the overall brightness, tone scale, image structure etc. of the digital image in a manner such that a pleasing looking image is produced by an image output device 30a. Those skilled in the art will recognize that the present invention is not limited to just these mentioned image processing modules.

The general control processor 40a shown in FIG. 3 may store the present invention as a computer program stored in a computer readable storage medium. The computer readable storage medium may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 46a.

It should also be noted that the present invention implemented in a combination of software and/or hardware is not limited to devices that are physically connected and/or located within the same physical location. One or more of the devices illustrated in FIG. 3 may be located remotely and may be connected via a wireless connection.

Figure 4:
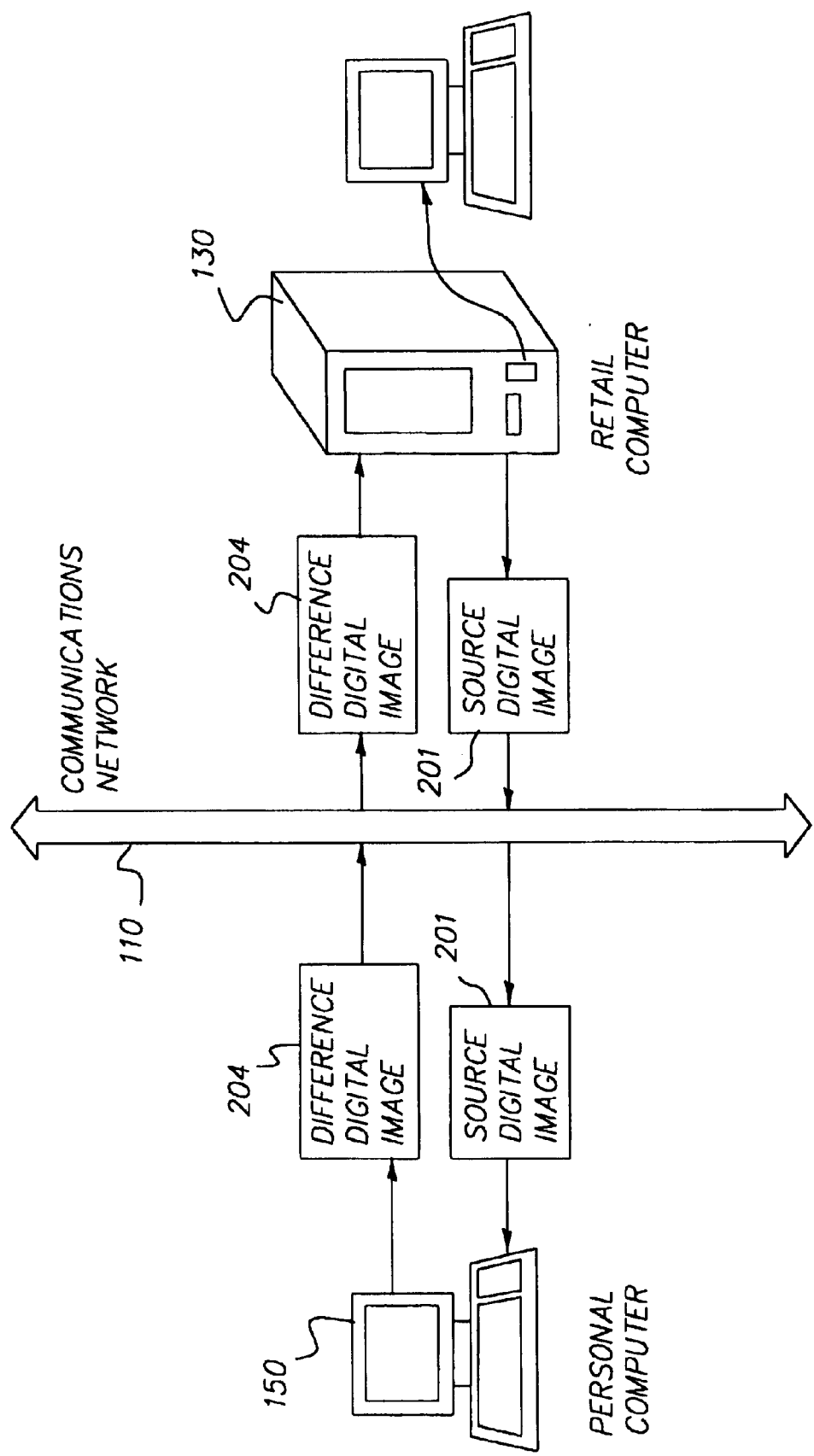
FIG. 4 is a block diagram showing two computers connected via a communications network exchanging a source digital image and a difference digital image.

The diagram illustrated in FIG. 4 shows two computer systems as connected together via a communications network 110. The image retail computer 130 is connected to the communications network 110, and receives a set of source digital images that originated from a user. A user (a person or persons) visits a retail store, drop of a roll of photographic film negatives with the retail computer 130 scanning the roll of photographic film negatives on an film scanner to produce the set of source digital images. Alternatively the retail computer receives a set of source digital images via the communications network 110 from some other source which might include a wholesale computer 140 or a personal computer 150. For each digital image in the set of source digital images the following procedure is performed. The retail computer 130 stores the source digital image 201 on an offline memory device 46a for later use and sends the source digital image 201 to the communications network 110. The personal computer 150 receives the source digital image 201 from the communications network 110. The source digital image 201 is modified by software executing on the personal computer 150 that results in a modified digital image 203a. The personal computer 150 calculates a difference digital image 204 corresponding to the source digital image 201. The difference digital image 204 is sent to the communications network 110 and received by the retail computer 130. The retail computer 130 combines the difference digital image 204 with the source digital image 201 retrieved from the offline storage device 46a and produces a modified digital image 203b. The modified digital image 203b is identical or nearly identical to the modified digital image 203a.

A key aspect of the present invention relies on the fact that both computers, the retail computer 130 and the personal computer 150, have a copy of the source digital image 201. The present invention can be practiced with any image manipulation software executing on the personal computer 150 that produces the modified digital image 203a. Another important aspect of the present invention relies on the fact that difference digital image 204, when combined with a copy of the source digital image 201 can result in a modified digital image 203b which is the same as the modified digital image 203a originally produced on the personal computer 150. While it is possible to send the modified digital image 203a over the communications network 110, the difference digital image 204 usually represents a smaller amount of data. Thus, the present invention has the advantage of recreating a modified digital image 203a while reducing the communications bandwidth requirements and allowing the user to modify the source digital image with any image manipulation software.

Once the difference digital image 204 has been calculated, there are many ways that it can be sent to the retail computer 130. In a preferred embodiment of the present invention, the difference digital image 204 is compressed and is sent to the retail computer 130 via a communications network such as the Internet. Alternatively, the difference digital image 204 could be stored on a removable computer readable storage medium, such as a magnetic floppy disk or an optical disk, which could then be used to transport the difference digital image to the retail computer 130.

A significant advantage of the present invention over existing methods is that the difference digital image 204 will generally be much more compressible than the modified digital image 203a due to the fact that for many images the differences between the modified and source images will be small throughout large portions of the image. As a result, the difference digital image 204 will typically be highly compressible using image compression algorithms, such as the well known JPEG compression algorithm. Therefore, the amount of digital data that needs to be sent to the retail computer 130 is typically much less than would be required to send the modified digital image 204 directly. This will result in faster transmission times across a communications network, or smaller storage requirements on a removable computer readable storage medium.

The user selects user selects a method of payment and the retail computer 130 then sends the modified digital image(s) 203b to a digital printer which produces hard copy images in the form of paper reflection prints. The user then returns to the retail store to pick up paper reflection prints. The present invention is not limited to paper reflection prints and may include other forms of reproduces images such as but not limited to photographic film transparencies.

Figure 5:
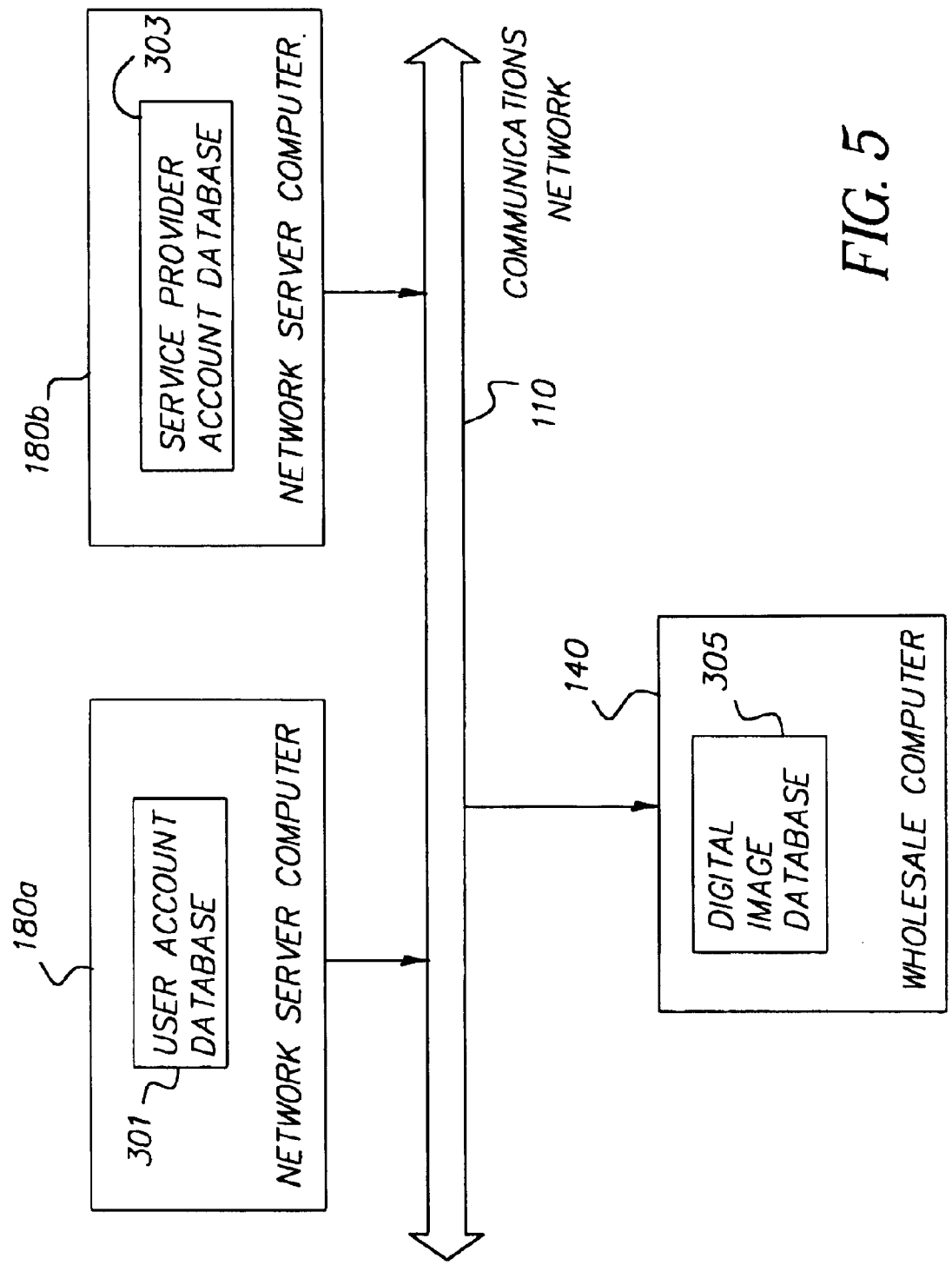
FIG. 5 is a block diagram showing two network server computers connected via a communications network.

Other types of computers can also be attached to the communications network 110. For example, consider the case where a user makes payment via the Internet. One common way for the user to provide a payment identifier to a service provider would be for him or her to supply a valid credit card number. Referring to FIG. 5, the service provider, the retail store personnel, would then access a user account database 301 on a network server computer 180a to debit the appropriate payment. The payment would then be credited to an account specified by the service provider by accessing a service provider account database 303 on network server 180b. Depending on the imaging chain and business model used for a particular system, payment could be required from a user at a number of different points in the image modification process. For example, payment could be required in order to scan the source images and/or to store the resulting source digital images in a digital image database 305. Payment could also be required when a source digital image 201 is downloaded to the personal computer 150. Other points where it might be appropriate to require payment would include charging for access to proprietary image modification algorithms, for the storage of the modified digital image in a digital image database, or for the printing of the second modified digital image 203b at the retail computer 130.

Figure 1:
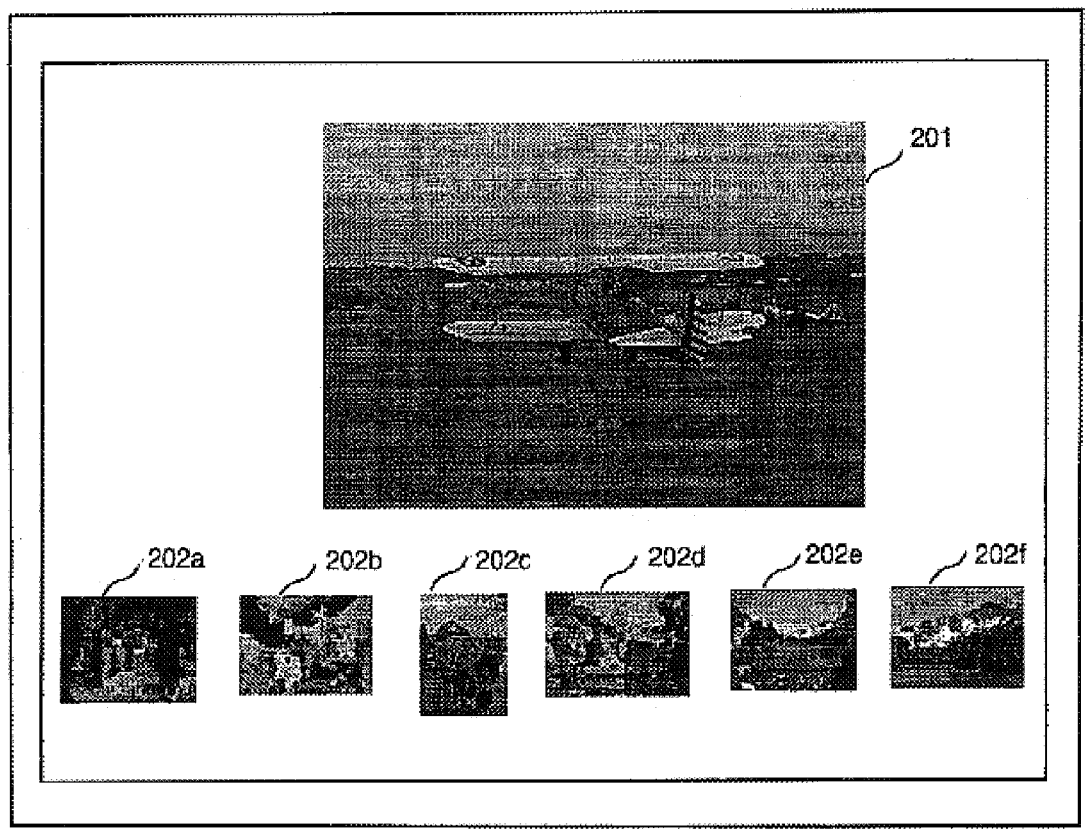
FIG. 1 is a pictorial diagram showing a display of digital images produced by the present invention.
Figure 6:
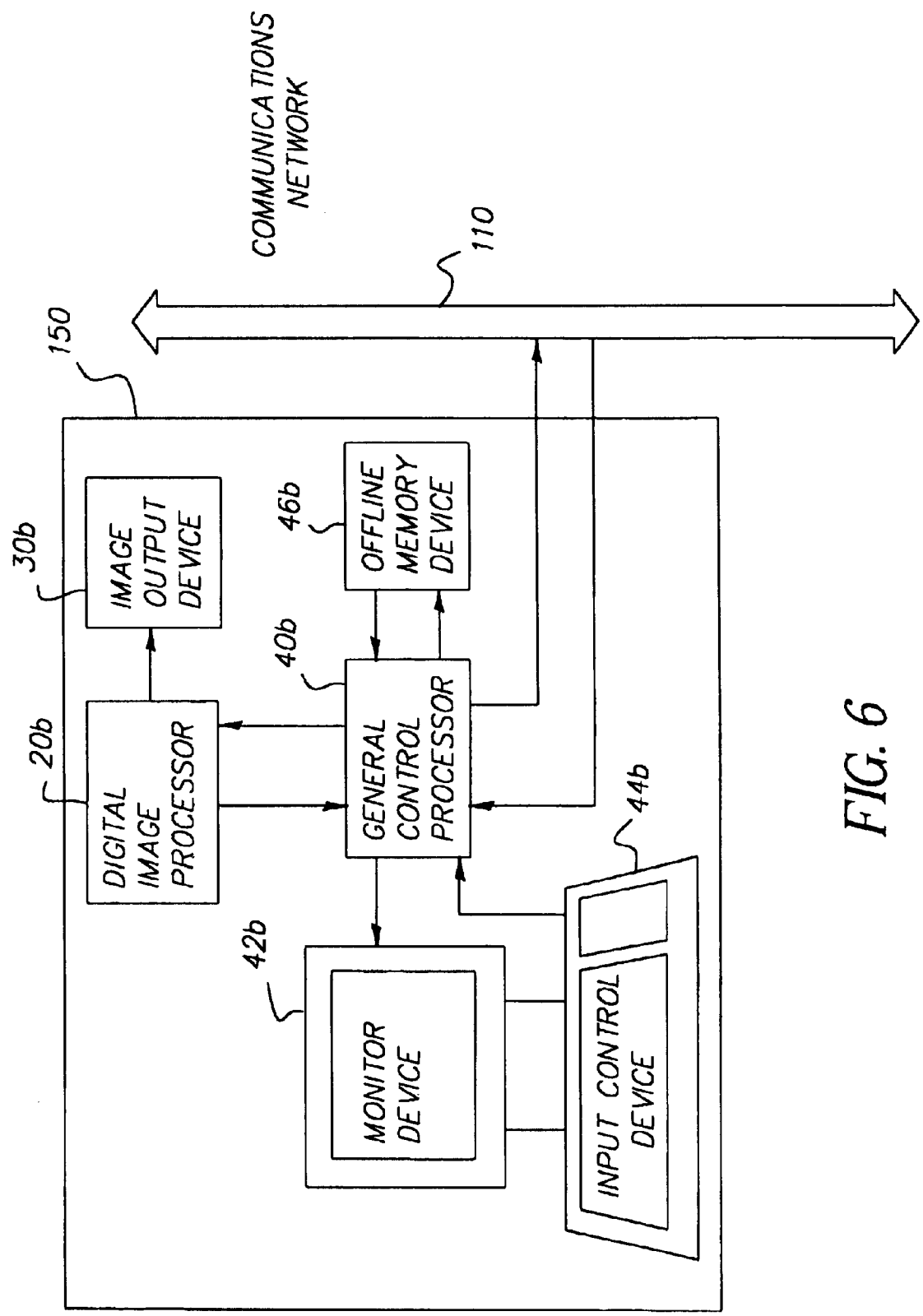
FIG. 6 is a block diagram showing a personal computer which includes a digital image processor.

FIG. 6 shows the components of the personal computer 150 shown in FIG. 4. Referring to FIG. 6, the general control processor 40b receives the source digital image(s) 201 and displays them on the monitor device 42b. FIG. 1 shows an example display screen as presented on a monitor device 42b connected to the personal computer 150 shown in FIG. 6. In similar fashion to the computer shown in FIG. 3, the personal computer 150 shown in FIG. 6 also includes an image output device 30b and an offline memory device 46b. Referring to FIG. 1, the source digital image 201 is displayed relatively large in size and is the active digital image being modified by the digital image processor 20b shown in FIG. 6. Other source digital images 202a, 202b, 202c, 202d, 202e and 202f are shown in smaller size in FIG. 1 as these images are not actively being processed. The digital image processor 20b shown in FIG. 6. Is connected to an image enhancement control 200 shown in FIG. 1. The user has the option for interacting with the image manipulation software to adjust the modified digital image 203a produced by the digital image processor 20b. An example of image enhancement control 200 is a software slider that allows the user to adjust the lightness of the modified digital image 203a.

Figure 7:
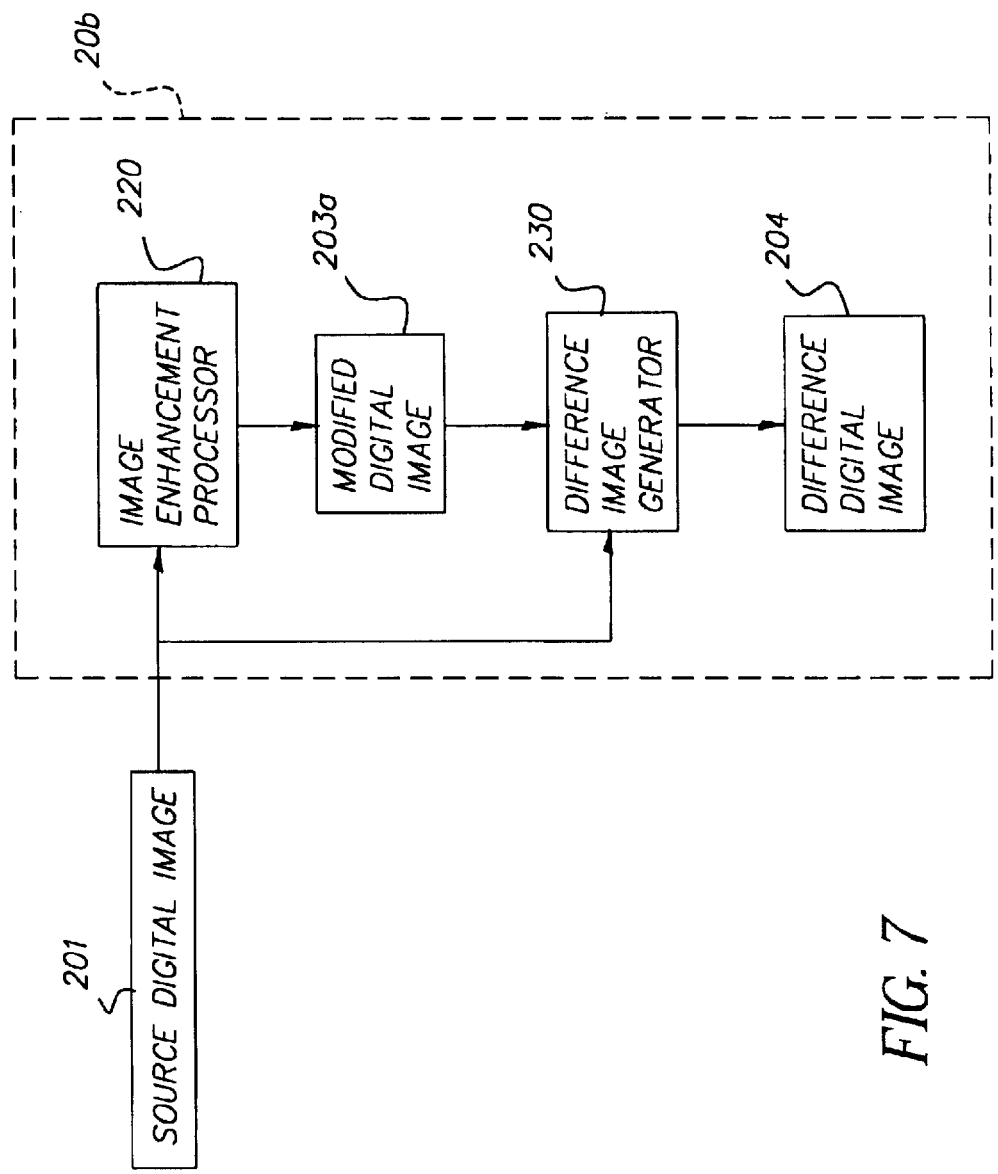
FIG. 7 is a block diagram showing the details of the digital image processor of the personal computer.

The details of the digital image processor 20b are shown in FIG. 7. The image enhancement processor 220 receives the source digital image(s) 201 and produces the modified digital image(s) 203a. The difference image generator 230 receives the modified digital image(s) 203a and the source digital image(s) 201 and produces the difference digital image 204.

Figure 8:
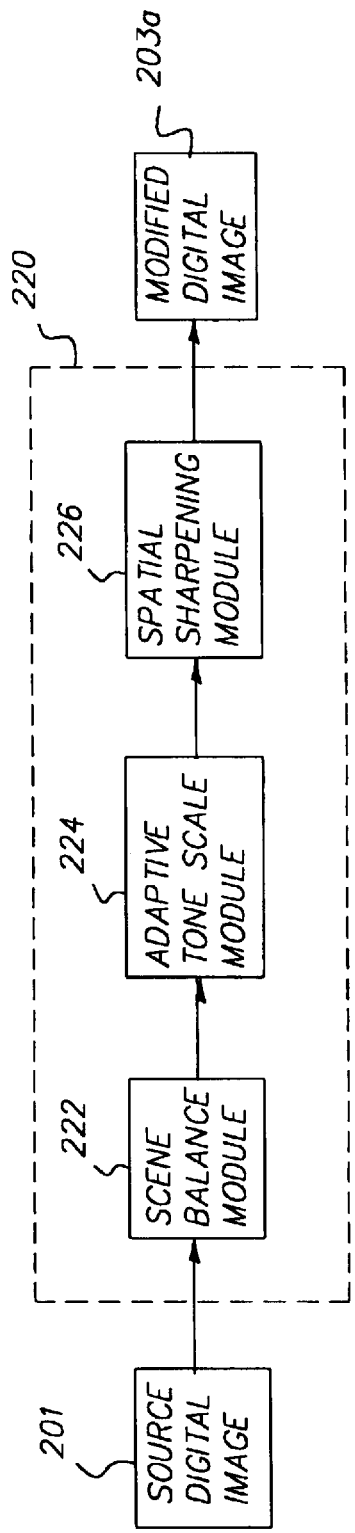
FIG. 8 is a block diagram showing the components of an image enhancement processor.

The scene balance module 222 is shown in FIG. 8 performs an adjustment for the overall exposure during capture and for the color of the illumination source. The source digital image 201 is received by the scene balance module 222 that produces a balanced digital image. The present invention may be practiced with any scene balance module such as the one described by Cok in U.S. Pat. No. 4,945,406. The scene balance module calculates the pixel values of a theoretical 20% gray card corresponding to the exposure of the source digital image 201. A look-up-table is calculated and applied to the source digital image 201 that results in a balanced digital image. Although no scene balance module performs perfectly at the task of compensating the digital image for variations in exposure and illumination color effects, the scene balance module 222 does improve the accuracy of the color representation. This scene balance transform is an example of an exposure compensation transform that in general is designed to adjust both the luminance and chrominance values of a digital image.

The present invention may also be practiced with a scene balance module that involves operator intervention. As an alternative embodiment of the present invention, the general control processor 40b shown in FIG. 6 is used to interface to a monitor device 42b and an input control device 44b. One or more renditions of the balanced digital image are displayed on the monitor device 42b with a human operator indicating a choice of rendition with the input control device 44b. The choice of display rendition is used to adjust the lightness and color balance. In similar manner to the preferred embodiment, a look-up-table is calculated and applied to the balanced digital image.

The adaptive tone scale module 224 receives the balanced digital image and transforms the digital image into a representation which includes a luminance digital image channel with the application of a linear 3 by 3 matrix transform. The resulting digital image channels of the balanced digital image are linear combinations of the starting digital image channels. The transformation generates new pixel values as linear combinations of the input color pixel values. The balanced digital image includes red, green, and blue digital image channels. Each digital image channel contains the same number of pixels. Let $R_{ij}$, $G_{ij}$, and $B_{ij}$ refer to the pixel values corresponding to the red, green, and blue digital image channels located at the $i^{th}$ row and $j^{th}$ column. Let $L_{ij}$, $C1_{ij}$, and $C2_{ij}$ refer to the transformed pixel values of the modified digital image. The 3 by 3 matrix transformation relating the input and output pixel values is as follows:

$$L_{ij} = \tau_{11} R_{ij} + \tau_{12} G_{ij} + \tau_{13} B_{ij} \quad (3)$$

$$C1_{ij} = \tau_{21} R_{ij} + \tau_{22} G_{ij} + \tau_{23} B_{ij}$$

$$C2_{ij} = \tau_{31} R_{ij} + \tau_{32} G_{ij} + \tau_{33} B_{ij}$$

where the $\tau_{mn}$ terms are the coefficients of the 3 by 3 LCC matrix denoted by $[\tau]$. The constants employed by the present invention for $\tau_{11}$, $\tau_{12}$ and $\tau_{13}$ are 0.333, 0.333 and 0.333 respectively. It is important to note that the present invention may be practiced with other luminance chrominance transformation and still yield good results. For example, a matrix with $\tau_{11}$, $\tau_{12}$ and $\tau_{13}$ values set to 0.30, 0.59, and 0.11 respectively also works well. An alternative method involves transforming the red green blue values of the balanced digital image back to CIE XYZ values where the Y channel of the new description would serve as the luminance digital image channel.

The pixels in the balanced digital image are used to generate a tone scale function, i.e. a single valued mathematical equation or transformation that has a single output value corresponding to each input value. The present invention implements the tone scale function as a look-up-table for computation efficiency. The result of the application of the tone scale processing produces a tone scale adjusted digital image.

The present invention may be practiced with a variety of methods that generate tone scale functions. The preferred embodiment of the present invention uses the methods disclosed in U.S. Pat. Nos. 4,731,671 and 5,822,453. These methods are employed by the present invention to produce two individual tone scale functions. These two tone scale functions are then cascaded into single tone scale function that is used to adjust the brightness and contrast of the balanced digital image.

In U.S. Pat. No. 5,822,453, Lee et al. disclose a method of calculating a tone scale function using the pixel values of a digital image involving estimating the scene contrast from the digital image. The method taught by Lee et al. includes calculating a Laplacian filtered version of the source digital image. Next, the method forms a histogram of the Laplacian filtered version. The method further includes determining two threshold values from the histogram. These two threshold values are then applied to the Laplacian filtered version resulting in a binary weighting mask. This binary weighting mask is used to identify and eliminate from further consideration uniform areas. A standard deviation value is calculated from the histogram of non-uniform area selected from the source digital image. The contrast of the source digital image is estimated by comparing the calculated standard deviation value with a predetermined standard deviation value. The method described by Lee et al. is used to calculate a first tone scale function.

In U.S. Pat. No. 4,731,671, Alkofer discloses a method of calculating a tone scale function using the pixel values of digital image based on normalizing the histogram of a digital image. This method includes determining the contrast of the balanced digital image by calculating the standard deviation of a sample of pixel values. The second tone scale function is calculated by normalizing a histogram of the sample of pixels values. The sample of pixel values is selected from one of a plurality of samples of pixel values corresponding to a plurality of contrast intervals based upon the shape of the histogram of the selected sample of pixel values. To facilitate the adjustment of contrast, the tone scale function is constructed to produce values in units of a standard normal variate Z. These Z values are then multiplied by a constant that is a function of the standard deviation of the sample of pixel values to determine the contrast of the processed digital image.

The first and second tone scale functions are combined into a final tone scale function using the mathematical formula:

$$LUT_f = LUT_1[LUT_2[j]] \quad (4)$$

where $LUT_2$ represents the second tone scale function, $LUT_1$ represents the first tone scale function, and $LUT_f$ represents the final tone scale function. The j variable represents the index of pixel values of the digital image to be processed. The final tone scale function $LUT_f$ is calculated by evaluating the expression of equation (4) for the range of possible pixel values.

The final tone scale function $LUT_f$ and the balanced digital image are received a tone scale function applicator. The present invention applies the final tone scale function to the luminance digital image channel of the balanced digital image to adjust the brightness and contrast attributes of the digital image.

The preferred embodiment of the present invention applies the final tone scale function, in the form of a look-up-table, directly to the pixels of the luminance digital image channel of the balanced digital image. This method is preferred primarily for its computational efficiency properties. An alternative embodiment of the present invention employs a method of applying a tone scale function disclosed by Lee et al. in U.S. Pat. No. 5,012,333 for improved image quality results. Although Lee et al. describe a method for interactively modifying image attributes, the present invention employs the method of applying tone scale functions to digital images based on spatial filtering techniques. This method involves spatially filtering the luminance digital image channel resulting two spatial frequency components, (high and low components), applying the tone scale function to the low spatial frequency component, and combining the tone scale modified low spatial frequency component with the high spatial frequency component. The resulting processed digital image has enhanced brightness and contrast attributes with improved spatial detail content.

Referring to FIG. 8, the spatial sharpening module 226 receives the tone scale adjusted digital image from the adaptive tone scale module 224 and applies a spatial filter to the tone scale adjusted digital image to adjust spatial modulation content. The present invention may be practiced with a variety of different spatial filters. An example of a spatial filter that may be used is described by Kwon et al. in U.S. Pat. No. 5,081,692. Kwon et al. teach a method of spatially processing a digital image involving transforming a red-green-blue image into a luminance chrominance domain and applying an adaptive filter to the luminance channel. The adaptive filter employs a method of calculating a statistical measure of local spatial activity and varying the sharpness of the image detail structure based the statistical measure. The result of the application of the spatial filter produces the sharpened digital image.

The sharpened digital image is transformed from a luminance-chrominance representation back to a red-green-blue channel representation with the application of a linear 3 by 3 matrix transform. The resulting digital image channels of the sharpened digital image have the same color metric representation as the balanced digital image. The transformation generates new pixel values as linear combinations of the input color pixel values.

Each digital image channel of the sharpened digital image contains the same number of pixels. Let $L_{ij}$, $C1_{ij}$, and $C2_{ij}$ refer to the pixel values corresponding to the luminance and two chrominance digital image channels located at the $i^{th}$ row and $j^{th}$ column. Let $R'_{ij}$, $G'_{ij}$, and $B'_{ij}$ refer to the transformed pixel values of the modified digital image. The 3 by 3 matrix transformation relating the input and output pixel values is as follows:

$$R'_{ij}=\eta_{11}L_{ij}+\eta_{12}C1_{ij}+\eta_{13}C2_{ij}$$
$$G'_{ij}=\eta_{21}L_{ij}+\eta_{22}C1_{ij}+\eta_{23}C2_{ij}$$
$$B'_{ij}=\eta_{31}L_{ij}+\eta_{32}C1_{ij}+\eta_{33}C2_{ij}$$

(5)

where the $\eta_{mn}$ terms are the coefficients of the 3 by 3 matrix transformation.

The preferred embodiment of the present invention constructs the RGB conversion matrix denoted by $[\eta]$ above as the inverse of the LCC matrix denoted by $[\tau]$ corresponding to the luminance-chrominance conversion operation. This is mathematically represented in matrix notation as $$[\eta]=[\tau]^{-1}$$ (6)

The image modification software for performing the modifications to the source digital image 12 could be supplied in many different ways. For example, a commercial or custom image modification software package could be stored on a computer at the second processing site 20. Alternatively, an image modification software package could be stored on a remote site and downloaded to a computer at the second processing site via a communications network. In other embodiments, a custom image modification software package could be distributed together with the source digital images on a computer readable storage medium.

The difference image generator 230 shown in FIG. 7 is used to calculate a difference digital image 204 using both the received modified digital image 203a and the source digital image 201. There are many different ways that the difference digital image can be determined. In a preferred embodiment of the present invention, the difference digital image 204 can be computed by subtracting the source digital image 201 directly from the modified digital image 203a on a pixel-by-pixel basis. Alternatively, it may be desirable in some cases to apply some kind of transformation to the source digital image 201 and/or the modified digital image 203a before computing the difference digital image 204. For example, if the image enhancement processor 220 includes a transformation of the source digital image from a first color space to a different color space, then it may be desirable to transform the images to a common color space before computing the difference digital image in order to keep the values of the difference digital image as small as possible. This will generally be advantageous for the compressibility of the difference digital image 204. One particular example where this would be important is where the source digital image 201 is an extended color gamut digital image, and the modified digital image has been rendered to a particular output color space.

There are many other variations in the way that the difference digital image 24 can be calculated. For example, a ratio could be determined between the source digital image 201 and the modified digital image 204 rather than using a subtraction operation.

Figure 9:
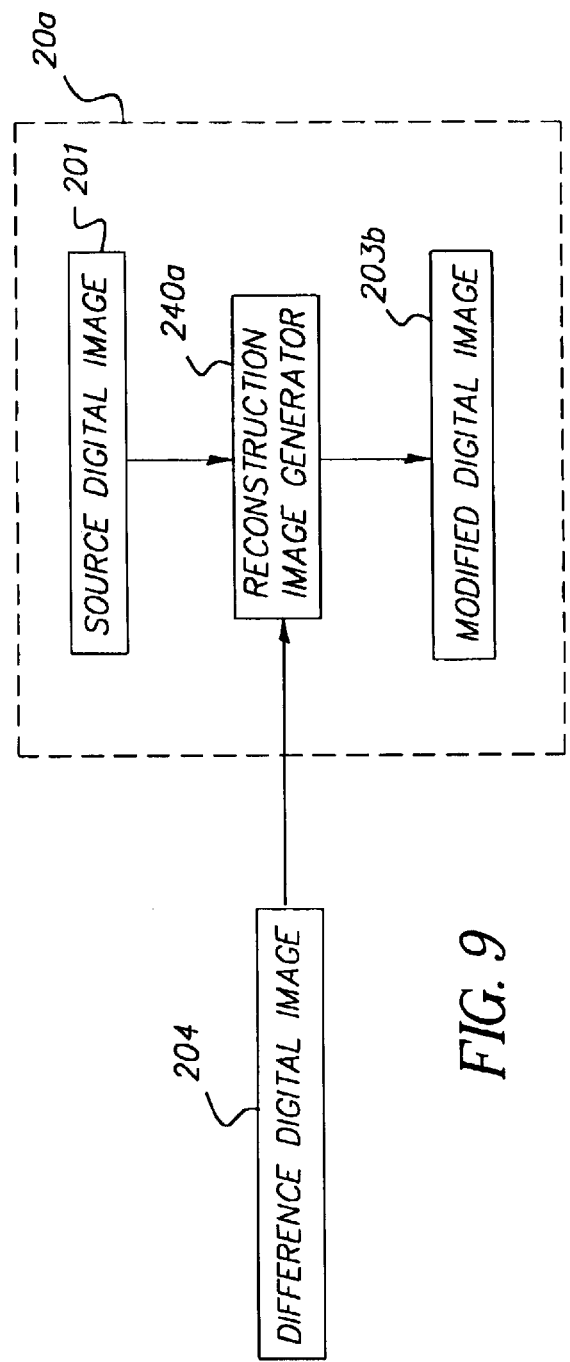
FIG. 9 is a block diagram showing the details of the digital image processor of the retail computer.

The details of the digital image processor 20a of the retail computer 130 are shown in more detail in FIG. 9. The reconstruction image generator 240a receives the source digital image 201 from the offline memory device 46a the difference digital image 204 from the general control processor 40a. A second modified digital image 203b is calculated by combining the source digital image 201 with the difference digital image 204. For the case where the difference digital image 204 has been compressed, a decompression step needs to be applied to the compressed difference digital image 204. For the case where the difference digital image 204 has been calculated by a pixel-by-pixel subtraction operation, the modified digital image 203b can be calculated by a simple pixel-by-pixel addition operation which adds the difference digital image 204 back to the source digital image 201. For the case where other types of operations have been used to calculate the difference digital image 204, the inverse of the operations would typically be required.

The resulting second modified digital image 203b will generally be identical or nearly identical to original modified digital image 203a. However, it may not be an exact match due to the fact that compression errors will typically be introduced by the compression/decompression process. For particularly demanding applications, it may be desirable to use a loss-less compression scheme, or to send the difference digital image without using any compression at all. There may be cases where the modifications made to a particular digital image are so extensive that the difference digital image 204 is not as compressible as the modified digital image 203a. In such cases, it may be desirable to send the modified digital image 203a to the retail computer 130, rather than sending the difference digital image 204.

Once the second modified digital image 203b has been formed, there are many possibilities as to what can be done with the image. For example, the second modified digital image 203b can be stored in an image database on a network server, or output prints could be generated using a network printing service as described above.

Figure 10:
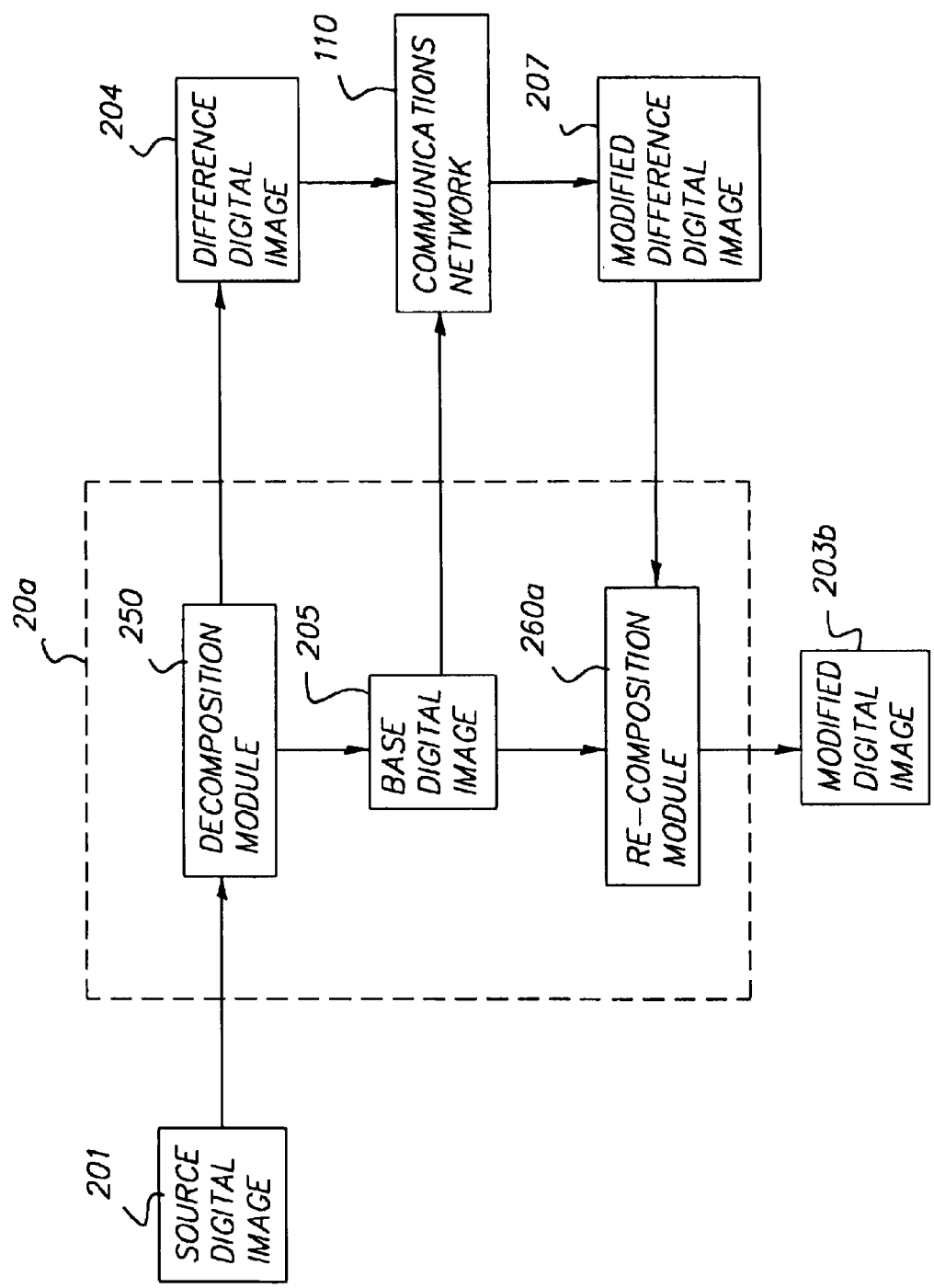
FIG. 10 is a block diagram of the digital image processor of a retail computer as practiced by an alternative embodiment of the invention.

An alternative embodiment of the present invention is illustrated in FIGS. 10 through 15 that uses the principles of the preferred embodiment of the present invention in a different configuration. The digital image processor 20a of a retail computer 130 is illustrated in FIG. 10. The decomposition module 250 receives a source digital image 201 and calculates a base digital image 205 and a difference digital image 204. The difference digital image 204 and the base digital image 205 are transmitted via the communications network 110 to a remote computer, e.g. a personal computer 150, that transmits back to the retail computer 130 a modified difference digital image 207. The re-composition module 260a receives the modified difference digital image 207 and the base digital image 205 and produces a modified digital image 203b. The base digital image 205 and the difference digital image 204 together are an alternative representation of the source digital image 201. The base digital image 205, the difference digital image 204, and the modified difference digital image 207 can be used with image compression methods to reduce the actual amount of data transmitted via the communications network 110.

Figure 11:
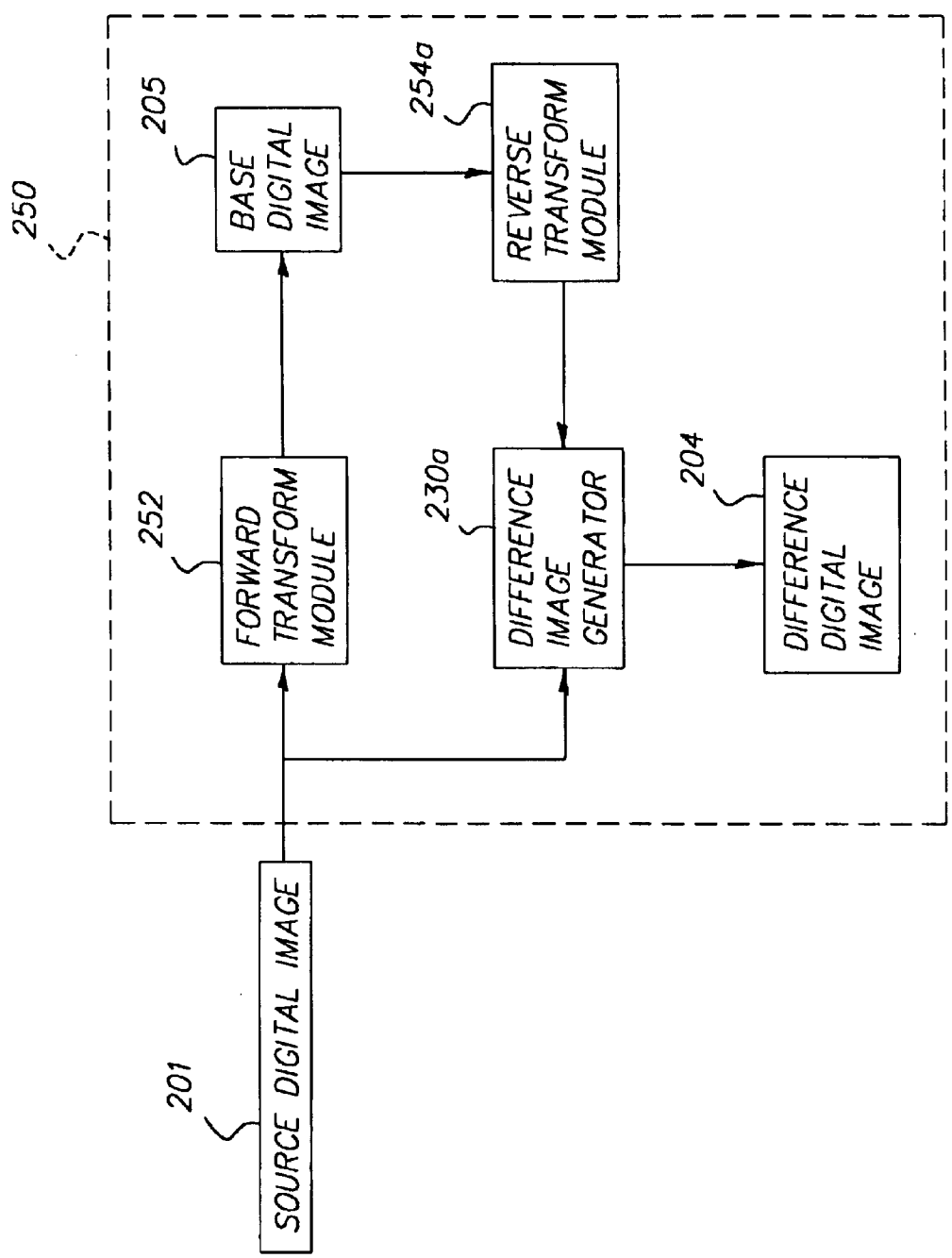
FIG. 11 is a block diagram showing the details of the decomposition module.

The decomposition module 250 shown in FIG. 10 is illustrated in more detail in FIG. 11. The source digital image 201 is received by the forward transform module 252 and produces a base digital image 205. The source digital image 201 and the base digital image 205 usually differ in at least one characteristic. Otherwise, the resulting difference digital image 204 will contain essentially no information. For example, the base digital image 205 may be a rendered version (i.e., prepared for an output device such as a video display) of the source digital image 201. As such, the base digital image 205 may have a reduced dynamic range and/or color gamut compared with the source digital image 201 and the resulting difference digital image would include the missing dynamic range and/or color gamut information. The forward transform module 252 and the reverse transform module 254a determine the characteristic differences between the base digital image 205 and the source digital image 201.

As another example, the present invention can be used with a source digital image 201 characterized by extended bit-depth information, e.g. 12-bits. The forward transform module 252 calculates a base digital image 205 characterized by a limited bit-depth, e.g. 8 bits of information. In the process of converting the source digital image 201 from an extended bit-depth to a limited bit-depth representation some information is lost. The reverse transform module 254a receives the base digital image 205 and calculates an extended representation of the base digital image 205. The difference image generator 230a receives the extended representation of the base digital image 205 and the source digital image 201 and calculates a difference digital image 204. This operation is as described above in the preferred embodiment of the present invention. The simplest of operations includes forming the difference digital image 204 by subtracting the source digital image 201 from the extended representation of the base digital image 205.

Those skilled in the art will recognize that the present invention is compatible with more complicated forward and reverse transforms. Furthermore, it is not necessary for the forward and reverse transforms to be mathematical inverses of one another. However, if the forward and reverse transforms are mathematical inverse of each other, the information content of the difference digital image 204 will be near a minimum.

Figure 12:
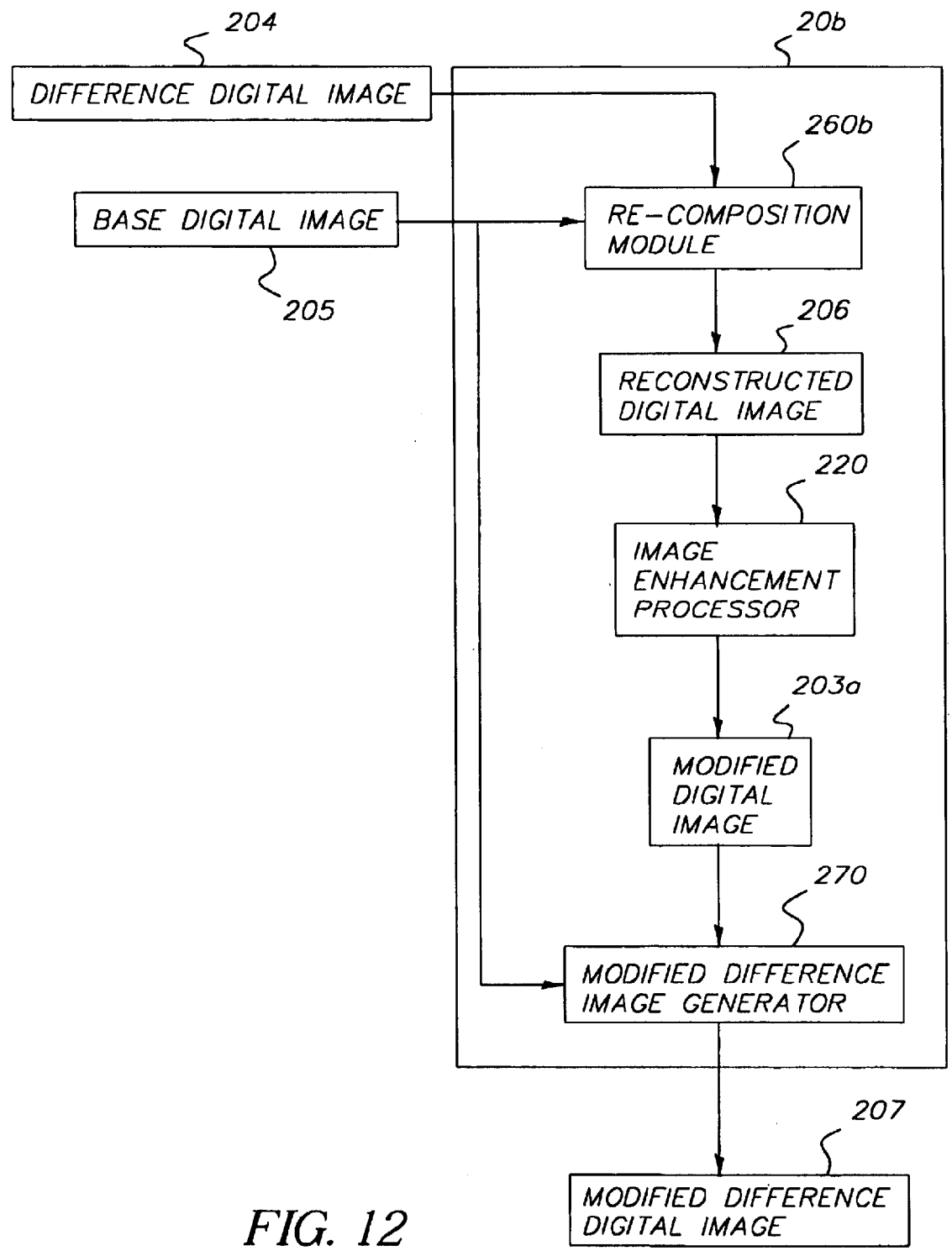
FIG. 12 is a block diagram of the digital image processor of a personal computer as practiced by an alternative embodiment of the invention.

The details of the digital image processor 20b within the personal computer 150 are shown in FIG. 12. The re-composition module 260b receives the base digital image 205 and the difference digital image 204 and produces a reconstructed digital image 206. The source digital image 201 and the reconstructed digital image 206 may or may not be identical to each other. If a lossy image compression transform is used as part of the transmission process via the communications network, these two images may not be identical. However, if a loss-compression transform or not image compression transform is used, the source digital image 201 and the reconstructed digital image 206 may be identical. The image enhancement processor 220, as described above in the preferred embodiment, receives the reconstructed digital image 206 and produces a modified digital image 203a. The modified difference image generator 270 receives the modified digital image 203a and the base digital image 205 and calculates a modified difference digital image 207. The personal computer 150 transmits the modified difference digital image 207 to the retail computer 130 via the communications network 110.

Figure 13:
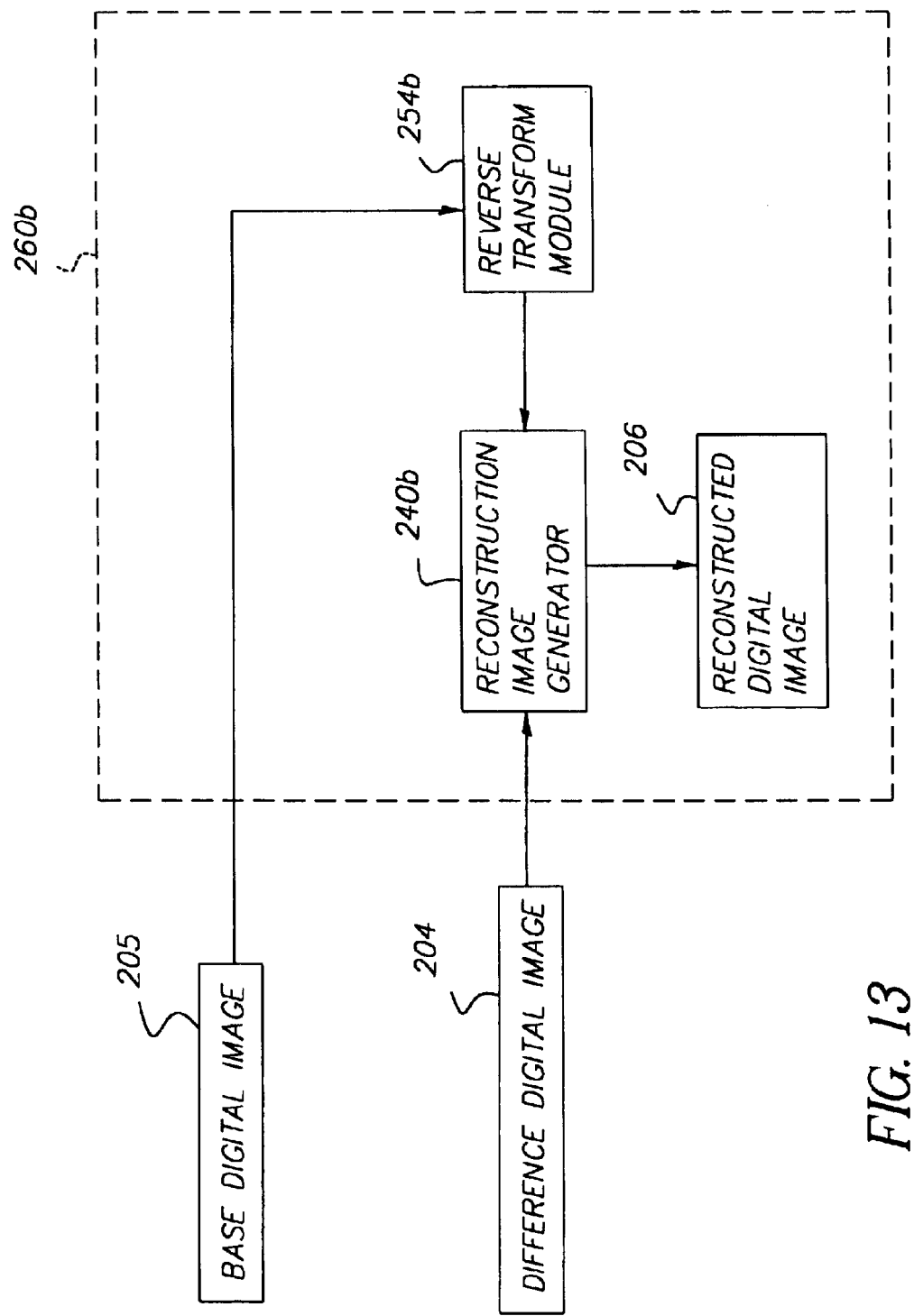
FIG. 13 is a block diagram showing the details of the re-composition module of the personal computer.

The re-composition module 260b shown in FIG. 12 is illustrated in more detail in FIG. 13. The reverse transform module 254b receives the base digital image 205 and calculates an extended representation of the base digital image 205. The reconstruction image generator 240b receives the extended representation of the base digital image 205 and the difference digital image 204 and produces a reconstructed digital image 206.

Figure 14:
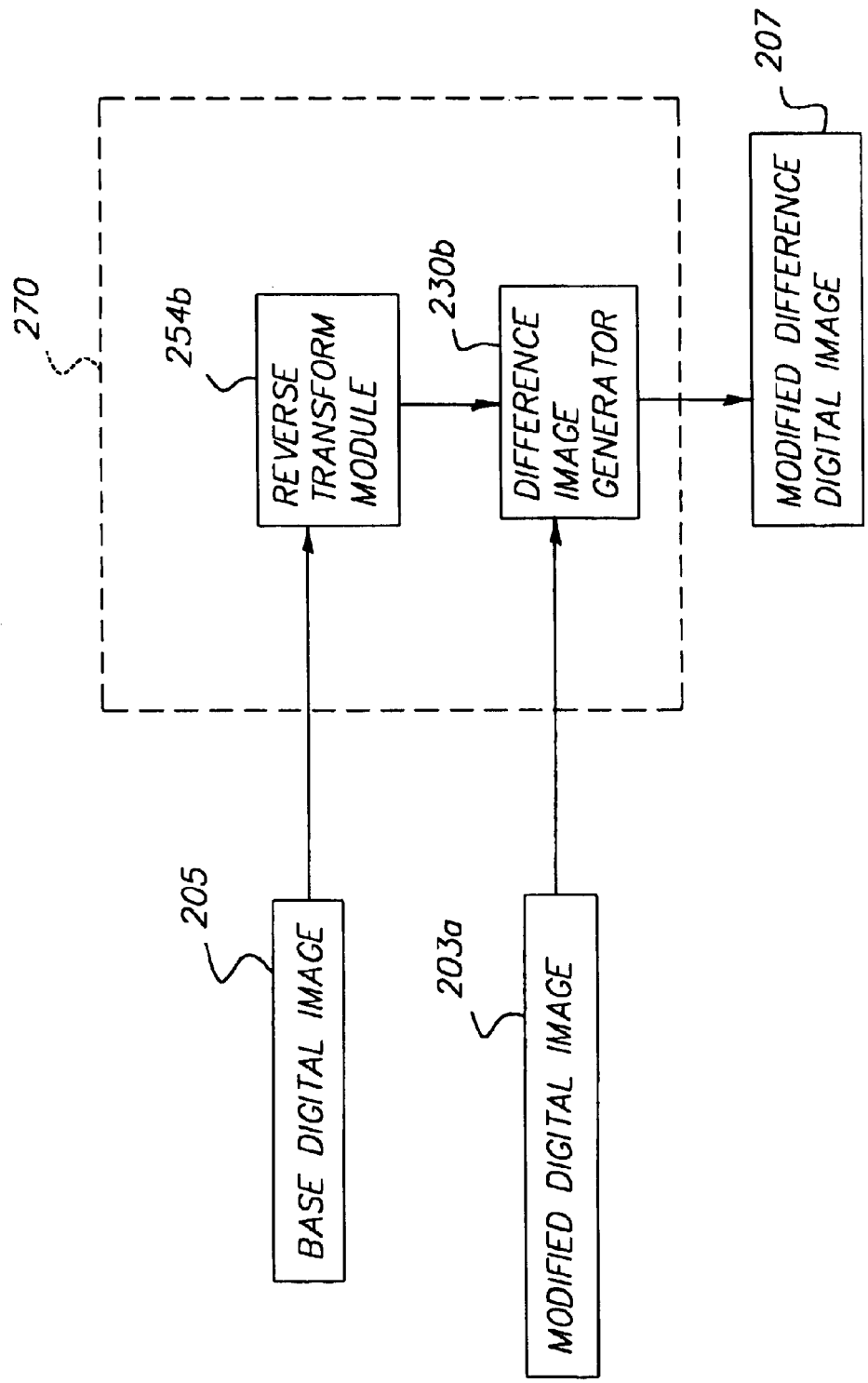
FIG. 14 is a block diagram showing the details of the modified difference image generator.

The modified difference image generator 270 shown in FIG. 12 is illustrated in more detail in FIG. 14. The reverse transform module 254b receives the base digital image 205 and calculates a extended representation of the base digital image 205. The difference image generator 230b receives the a extended representation of the base digital image 205 and the modified digital image 203a and calculates a modified difference digital image 207.

Figure 15:
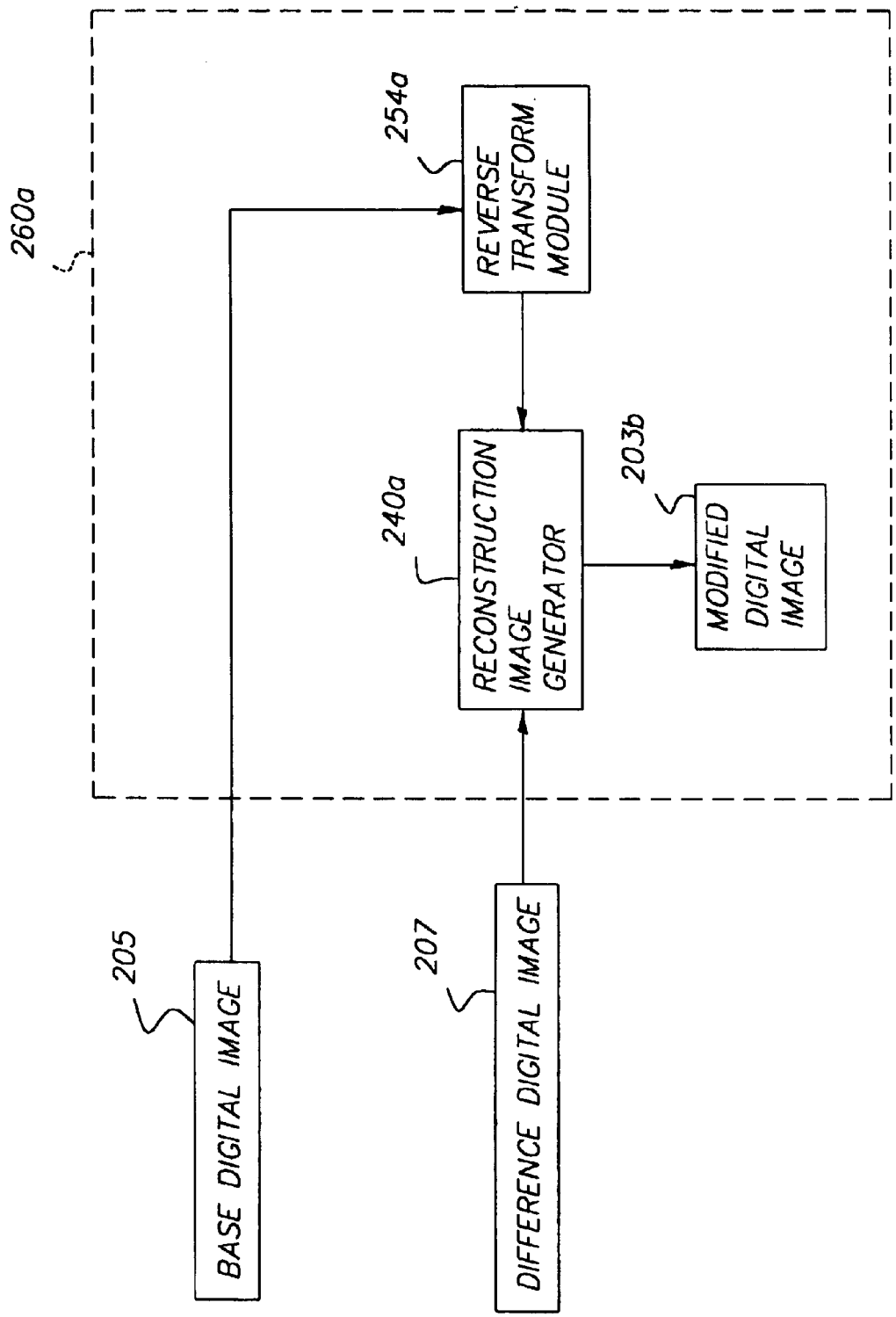
FIG. 15 is a block diagram showing the details of the re-composition module of the retail computer.

The re-composition module 260a shown in FIG. 10 is illustrated in more detail in FIG. 15. The reverse transform module 254a receives the base digital image 205 and calculates a 12 bit representation of the base digital image 205. The reconstruction image generator 240a receives the extended representation of the base digital image 205 and the modified difference digital image 207 and produces a modified digital image 203b. The modified digital image 203b and the modified digital image 203a are either identical or nearly identical.

This alternative embodiment of the present invention is more complicated and computationally intensive than the preferred embodiment but does have one advantage over the preferred embodiment. For practical digital imaging applications, the base digital image 205 received by the personal computer 150 can be displayed on a monitor device 42b directly since it is a rendered version of the source digital image 201. The image enhancement processor 220 produces the best quality results when operating on extended pixel information. Thus, the alternative embodiment of the present invention provides a framework for easily displaying digital images while also processing digital image for high quality results.

Those skilled in the art will recognize that although the above discussion has described the user as viewing, sending, and receiving digital images at a personal computer, the present invention can be practiced with any image capable computer. Similarly, the present invention can be practiced with image capable computers other than a computer located at a retail store.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

Each computer readable storage medium can comprise, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST 10 image capture device
20a digital image processor
20b digital image processor
30a image output device
30b image output device
40a general control processor
40b general control processor
42a monitor device
42b monitor device
44a input control device
44b input control device
46a offine memory device
46b offline memory device
100 image capable computer
110 communications network
120 connection computer
130 retail computer
140 wholesale computer
150 personal computer
160 mobile computer
170 kiosk computer
180a network server computer
180b network server computer
200 image enhancement control
201 source image
202a thumbnail image
202b thumbnail image
202c thumbnail image
202d thumbnail image

PARTS LIST (con't)

202e thumbnail image
202f thumbnail image
203a modified digital image
203b modified digital image
204 difference digital image
205 base digital image
206 reconstructed digital image
207 modified difference digital image
220 image enhancement processor
222 scene balance module
224 adaptive tone scale module
226 spatial sharpening module
230 difference image generator
230a difference image generator
230b difference image generator
240a reconstruction image generator
240b reconstruction image generator
250 decomposition module
252 forward transform module
254a reverse transform module
254b reverse transform module
260a re-composition module
260b re-composition module
270 modified difference image generator
301 user account database
303 service provider account database
305 digital image database

What is claimed is:

1. A method for processing a digital image in a distributed manner to produce a final modified digital image, comprising:

a) providing a source digital image at a first computer;

b) the first computer responding to the source digital image to produce a base digital image having a dynamic range less than the source digital image and a first difference digital image such that the base digital image and the first difference digital image can be recombined to produce a representation of the source digital image;

c) transferring the base digital image and the first difference digital image to a second computer which combines the base digital image and first difference digital image to produce a reconstructed digital image representing the source digital image;

d) the second computer modifying the reconstructed digital image to produce a modified digital image and determining a second difference digital image such that the base digital image and the second difference digital image can be recombined to produce the modified digital image;

e) transferring the second difference digital image to the first computer; and f) combining in the first computer the second difference digital image with the base digital image to form the final modified digital image.

* * * * *